(12) United States Patent
Clark

(10) Patent No.: US 12,104,631 B1
(45) Date of Patent: Oct. 1, 2024

(54) INFLATABLE CLAMPING APPARATUS AND SYSTEM FOR SECURELY SUPPORTING AN OBJECT ON AN ELONGATED MEMBER

(71) Applicant: Earl M. Harris, III, Susanville, CA (US)

(72) Inventor: Alfred E. Clark, Susanville, CA (US)

(73) Assignee: Earl M. Harris, III, Susanville, CA (US)

( * ) Notice: Subject to any disclaimer, the term of this patent is extended or adjusted under 35 U.S.C. 154(b) by 0 days.

(21) Appl. No.: 18/118,692

(22) Filed: Mar. 7, 2023

Related U.S. Application Data

(60) Provisional application No. 63/347,885, filed on Jun. 1, 2022.

(51) Int. Cl.
*F16B 2/08* (2006.01)
*F16M 13/02* (2006.01)

(52) U.S. Cl.
CPC ............. *F16B 2/08* (2013.01); *F16M 13/022* (2013.01)

(58) Field of Classification Search
CPC ................................ F16B 2/08; F16M 13/022
See application file for complete search history.

(56) References Cited

U.S. PATENT DOCUMENTS

| | | | |
|---|---|---|---|
| 8,943,817 B2* | 2/2015 | Blitz | F24S 50/20 60/398 |
| 11,502,639 B2* | 11/2022 | Betts | H02S 20/10 |
| 2011/0114080 A1* | 5/2011 | Childers | F16M 11/125 126/584 |
| 2023/0139980 A1* | 5/2023 | Madrone | F15B 15/103 92/92 |

* cited by examiner

*Primary Examiner* — Anita M King
(74) *Attorney, Agent, or Firm* — Richard A. Ryan

(57) ABSTRACT

An inflatable clamping apparatus and system that are utilized to securely support a wide variety of objects on an elongated member, such as a pole, post, beam, tree or the like. In one embodiment, the clamping apparatus has a pair of inflatable bladders that define a member receiving area, an air chamber inside each bladder, a connecting section interconnecting the bladders, an apparatus connecting mechanism that connects to the object, and an air valve to place pressurized air into the air chambers. In one configuration, the apparatus connecting mechanism connects to an object connecting mechanism associated with the object to secure the object to the apparatus. When the elongated member is in the member receiving area, the bladders are filled with air and the object is attached to the apparatus, the bladders will press tightly against the elongated member to securely hold the apparatus and object thereon.

20 Claims, 8 Drawing Sheets

INFLATABLE CLAMPING APPARATUS AND SYSTEM FOR SECURELY SUPPORTING AN OBJECT ON AN ELONGATED MEMBER

CROSS-REFERENCE TO RELATED APPLICATIONS

This patent application claims priority to U.S. Provisional Patent Application Ser. No. 63/347,885 filed Jun. 1, 2022.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses and systems which are utilized to support an object on a structure or part of a structure so persons can benefit from the placement of the object. In particular, the present invention relates to clamping apparatuses and systems that are configured to securely support an object on an elongated member so persons may use, see or otherwise benefit from the object. Even more particularly, the present invention relates to clamping apparatuses and systems which securely support a basketball backboard, sign or other object on an elongated support such as a pole, post, beam, tree trunk, tree limb or the like.

B. Background

Elongated members are commonly utilized to support many types of objects for a wide variety of different purposes. For instance, elongated poles and the like are frequently utilized to support signs, lights, wires, basketball backboards (usually with a rim and net) and a wide variety of other objects of all sizes and configurations. Perhaps most commonly, such elongated members are vertically disposed with a lower end thereof securely mounted in the ground, floor, court, patio or other surface and an upper end thereof either freely positioned (e.g. not attached to any structure) or attached to a roof or other structure. Objects such as those members described above and the like can also be attached to horizontally or angularly disposed members that are usually connected to another member or structure, such as a horizontally disposed beam or an angularly positioned pole. Though perhaps less common, such objects can be attached to tree trunks and limbs and or a variety of other non-pole elongated members.

In any type of configuration and for any object, the usual objective is to secure an object to an elongated member in a manner which beneficially positions the object so it can be clearly seen and, for many types of objects, utilized. For instance, it is generally common to secure a sign to a pole, post, beam, tree, tree limb or other member so that people can easily see a message on the front surface of the sign and take or not take action accordingly. The sign can be a traffic control sign, such as a stop, yield, speed limit and no parking sign or a variety of driver warning signs (e.g., to warn of approaching a curve, narrow bridge, low overhang, damaged road and the like). The sign can also be for more personal use that is related to the property where or near where the sign is located, such as signs warning of no trespassing, vicious or guard dogs, dangerous items or the like or signs identifying the location of an activity (such as a birthday, wedding, reception, holiday or other type of festivity). The sign can also be of the type that, instead of words or drawings on the front surface (or in addition to words and/or drawings), can have one or more warning items, such as lights, strobe lights, reflectors and the like, that by being displayed on the sign are intended to warn a person of a potential problem ahead. As stated above and as will be readily appreciated by persons who are skilled in the relevant art, a sign that is supported on an elongated object can be for any type of use and be of any shape and size.

In addition to signs, elongated members are also commonly utilized to support objects that comprise a base component and one or more functional items that are attached to the base object, whether to the front, back and/or sides of the base object. One very common example of a base that is supportedly attached to an elongated member is that of a basketball backboard having a basketball rim, which typically supports a net, that is attached to the backboard in a manner so as to extend the rim and net outwardly from the front surface of the backboard for use to play basketball. In a typical configuration, the basketball backboard is securely attached to a pole and positioned over a basketball court. As well known, however, often the basketball backboard is attached to a pole or other elongated member that extends over surfaces that are not a typical basketball court, including patios, driveways, yards and other non-conventional basketball surfaces. Often there is a desire to place a basketball backboard and rim, with or without the net, at locations that do not have a pole, but which may have another type of elongated member, so as to be able to shoot baskets or play other basketball-related games.

The use of a wide variety of other objects can benefit from being able to be attached to a pole or other elongated object to keep the object in place or to keep something attached to the object in place. For instance, a person may benefit from securing a leash or other restraint to a pole, tree, vehicle component or the like in order to keep a dog or other animal restrained in place to prevent the animal from wandering off or while the user is cleaning or otherwise treating the animal. A person can also benefit from securing a boat or other vehicle, as the object, that is tied off to a pole, post, tree or other elongated member to keep the object from moving away from where the user left it. A person may also benefit from securing decorations, such as Halloween or Christmas decorations (as the object), to a porch or patio by securing the decorations to a pole, post, beam, tree or the like so he or she can display the decoration. As will be readily appreciated by persons who are skilled in the relevant arts, there are nearly an infinite number of reasons why someone would want to secure an object to an elongated member, including poles, posts, beams, tree trunks, tree limbs and the like.

Typically, an object is attached to an elongated member using nails, bolts, staples, rivets or other semi-permanent connecting elements or by welding or other generally permanent connecting mechanism. In other uses, the object may be secured to an elongated member using U-shaped or C-shaped brackets or bolts. While such elements, mechanisms and methods of securing an object to an elongated member can work well, they have drawbacks of requiring tools to attach and remove and/or being otherwise difficult to remove. Removing an object, such as those set forth above, can be desired or otherwise beneficial when a person is done using the object (such as a basketball backboard) or the purpose for placing the object in place (such as a temporary traffic, party notice or other sign) is no longer needed or necessary. In addition to being difficult, many of the commonly utilized mechanisms, elements, devices and methods of removably supporting an object on an elongated member require multiple people and/or a ladder, stool or other means of raising the object up to fixedly or removably secure the object to the elongated member.

Despite the general availability of ways of securing an object, such as those described above and others, on an elongated member, there is a need for an improved apparatus and system for securing an object to an elongated member. More specifically, what is needed is an improved apparatus and system for securely supporting an object onto an elongated object that allows the object to be beneficially seen and/or utilized. Preferably, any new object securing apparatus and system should be structured and arranged to be easy to attach an object to an elongated member and easy to remove the object from the member when the use of the object is no longer necessary or desired. The object securing apparatus and system should be configured to tightly hold the object on an elongated member in a manner which will prevent the object from moving relative to the member while it is in use. Preferably any such apparatus and system should be adaptable for use with a wide range of different types of objects and elongated members and be relatively inexpensive to manufacture so it can be widely utilized.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising" or "having" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The new apparatus and system for removably supporting an object on an elongated member of the present invention provides the benefits and solves the problems identified above. That is to say, the present invention is directed to an inflatable clamping apparatus and system utilizing the apparatus for securely attaching and supporting an object on an elongated member, such as a pole, post, beam, tree trunk, tree limb and the like. More specifically, the new apparatus is an air clamp which utilizes at least one bladder with an air chamber that is filled with air to securely clamp around an elongated member to support an object which is attached to the air clamp on the elongated member. The new inflatable clamping apparatus and system securely supports an object on an elongated object to allow the object to be beneficially seen and/or utilized by the user and other persons. The new inflatable clamping apparatus and system are structured and arranged so as to be easy to attach an object to an elongated member and then to be able to easily remove the object from the member when use of the object is no longer necessary or desired. The clamping apparatus and system of the present invention are configured to tightly hold the object on an elongated member in a manner which will prevent the object from moving relative to the member while the object is in use. In the preferred embodiments of the present invention, the new inflatable clamping apparatus and system are readily adaptable for use with a wide range of different types and sizes of objects and elongated members and is relatively inexpensive to manufacture so the new apparatus and system can be widely utilized.

In one embodiment of the apparatus of the present invention, the new inflatable clamping apparatus for securely mounting an object on an elongated member generally comprises a first bladder having a first air chamber therein, a second bladder having a second air chamber therein, a connecting section that interconnects the first bladder and the second bladder, a member receiving area which is defined by the first bladder, the second bladder and the connecting section, an air valve that is associated with the first air chamber of the first bladder, an air valve which is associated with the second air chamber of the second bladder, and an apparatus connecting mechanism that is associated with the first bladder and/or the second bladder. The first bladder, second bladder and connecting section define a front surface and a back surface of the clamping apparatus. The member receiving area sized and configured to receive a bladder engaging section of the elongated member therein. The first air valve and second air valve are both configured to allow pressurized air to be received in and released from the first air chamber and the second air chamber to place each of the first bladder and the second bladder in, respectively, one of an inflated condition to expand the first bladder and the second bladder and a deflated condition to reduce the size of the first bladder and the second bladder. The apparatus connecting mechanism is structured and arranged to securely attach to the object in order to associate the object with the clamping apparatus. In use, when the bladder engaging section of the elongated member is in the member receiving area of the clamping apparatus and each of the first bladder and the second bladder are in their inflated conditions, the first bladder and the second bladder will tightly engage the elongated member to securely attach the clamping apparatus to the elongated member with the object positioned at or against the front surface of the clamping apparatus so as to display or utilize the object when the object is attached to the clamping apparatus by the apparatus connecting mechanism. In a preferred configuration, the first bladder, the second bladder and the connecting section configure the member receiving area into one of a generally U-shaped or C-shaped configuration. In one configuration where the object has a front surface and a back surface, each of the first bladder and the second bladder will press against the back surface of the object so as to allow a user to display or utilize the front surface of the object when the object is attached to the first bladder and the second bladder by the apparatus connecting mechanism and the bladders are in their inflated condition. Preferably, the apparatus connecting mechanism is structured and arranged to engage one or more cooperatively configured object connecting mechanisms that are associated with the object to securely attach the object to the clamping apparatus.

In one embodiment of the system of the present invention, the system generally comprises an object having a front surface and a back surface, an elongated member having an outer surface and a bladder engaging section, and the clamping apparatus described above. The elongated member is selected to mount the object thereon. In one embodiment, the system also comprises an air filling mechanism, such as a hand pump having an air hose that connects to the air valves of the clamping apparatus to direct pressurized air into each of the air chambers. As set forth elsewhere herein, a wide variety of different types, sizes and shapes of objects and elongated members can be utilized with the clamping apparatus of the present invention.

Accordingly, the primary object of the present invention is to provide a new clamping apparatus and system for removably supporting an object on an elongated member having the various advantages that are set forth above and which overcomes the various disadvantages and limitations that are associated with presently available mounting apparatuses and systems for supporting an object on an elongated member.

It is an important object of the present invention to provide a new apparatus and system for easily and securely attaching and supporting an object on an elongated member, such as a pole, post, beam, tree trunk, tree limb or the like, to allow persons to display and/or utilize the object while it is on the member and then to easily remove the object once it is no longer needed or necessary.

An important aspect of the present invention is that it provides a new apparatus and system for removably securing an object to an elongated member which accomplishes the objectives set forth above and elsewhere in the present disclosure.

Another important aspect of the present invention is that it provides a new clamping apparatus and system that is utilized to support an object on an elongated member so the object can be beneficially seen and/or utilized by the user and/or other persons.

Another important aspect of the present invention is that it provides an inflatable clamping apparatus that comprises one or more bladders which have an air chamber that is filled with air so the bladders will engage and at least partially envelope an elongated member to support the apparatus and an object attached to the apparatus on the elongated member.

Another important aspect of the present invention is that it provides a system comprising an inflatable clamping apparatus having one or more bladders with at least one air chamber therein, an object that is to be displayed and/or used, a connecting mechanism to connect the apparatus and the object, an elongated member to which the clamping apparatus attaches so as to beneficially allow use or display of the object, and an air fill mechanism that connects to the one or more bladders to fill the air chamber(s) with pressurized air so as to cause the bladder(s) to engage and at least partially envelope the elongated member to tightly secure the apparatus and object to the elongated member.

Another important aspect of the present invention is that it provides an inflatable clamping apparatus and system which functions as an air clamp having at least one air chamber that is filled with air to tightly clamp the apparatus around the body of an elongated member to removably support an object which is attached to the air clamp on the elongated member.

Another important aspect of the present invention is that it provides an inflatable clamping apparatus and system which are structured and arranged so as to be easy to supportedly attach an object to an elongated member and then allow the user thereof to be able to easily remove the object from the member when use of the object is no longer necessary or desired on that elongated member, thereby allowing the user to easily store, transport and/or move the object to different elongated member.

Another important aspect of the present invention is that it provides an inflatable clamping apparatus and system which are configured to tightly hold the object on an elongated member in a manner that prevents the object from moving relative to the member while the object is in use so that the user and/or others may be able to beneficially see and/or utilize the object.

Another important aspect of the present invention is that it provides an inflatable clamping apparatus and system which are readily adaptable for use with a wide range of different types and sizes of objects and elongated members.

Yet another important aspect of the present invention is that it provides an inflatable clamping apparatus and system which is relatively inexpensive to manufacture so the apparatus and system can be widely utilized.

As will be explained in greater detail by reference to the attached figures and the description of the preferred embodiments which follow, the above and other objects and aspects are accomplished or provided by the present invention. As set forth herein and will be readily appreciated by persons who are skilled in the art, the present invention resides in the novel features of form, construction and mode of operation presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

Figure 1:
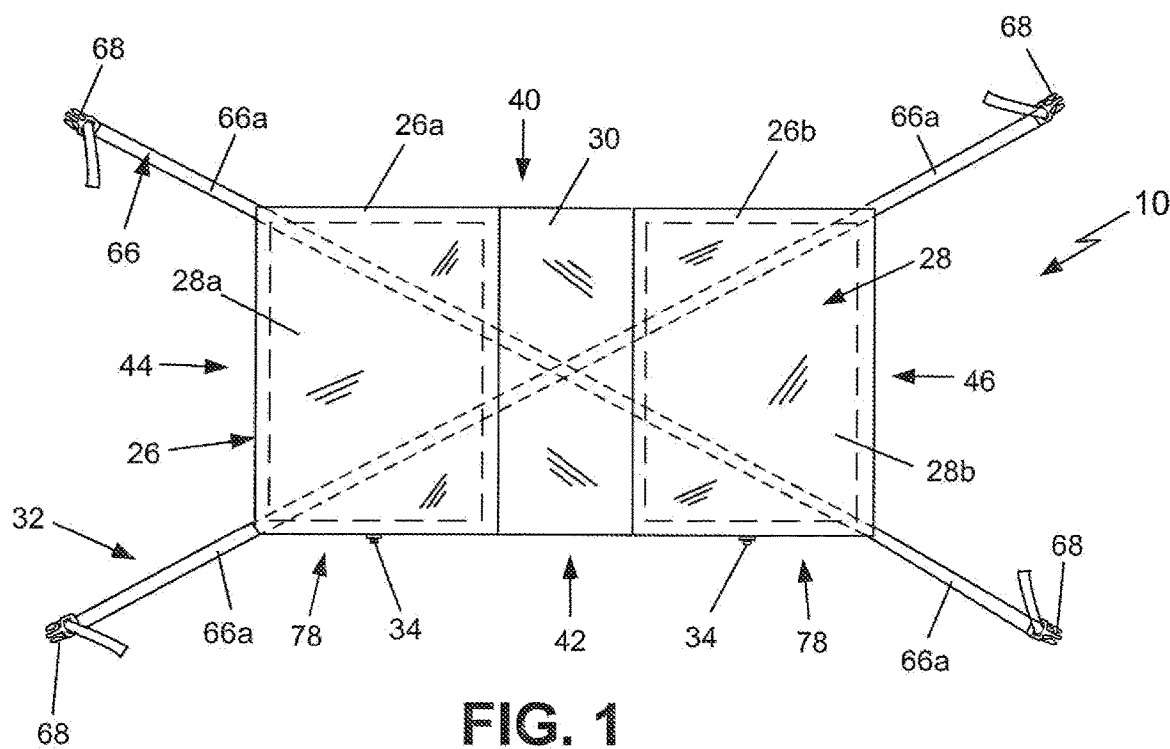
FIG. 1 is a front view of an inflatable clamping apparatus that is configured according to a first embodiment of the present invention, with the apparatus shown having a pair of bladders shown in their inflated condition that are separated by a connecting section with a pair of straps across the back surface of the apparatus.
Figure 2:
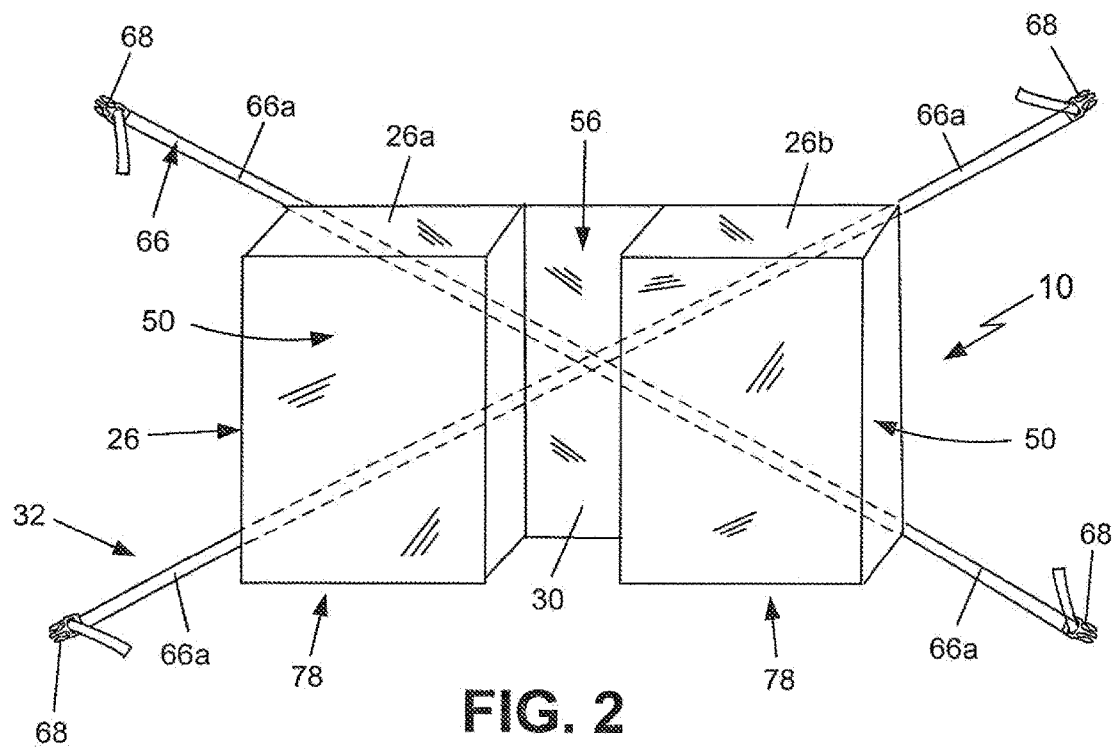
FIG. 2 is a top perspective view of the inflatable clamping apparatus of FIG. 1.
Figure 3:
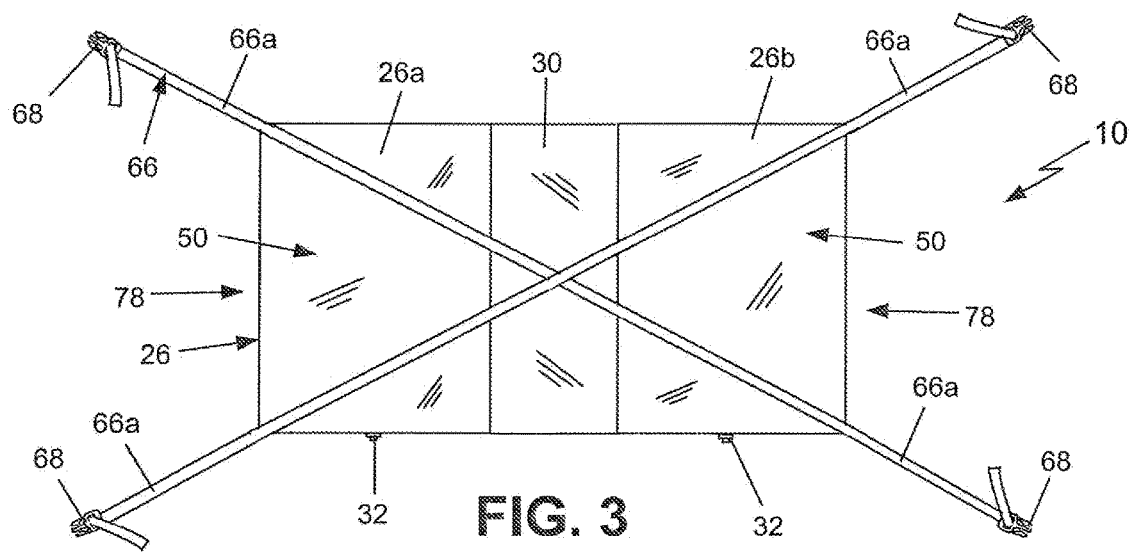
FIG. 3 is a back view of the inflatable clamping apparatus of FIG. 1.
Figure 4:
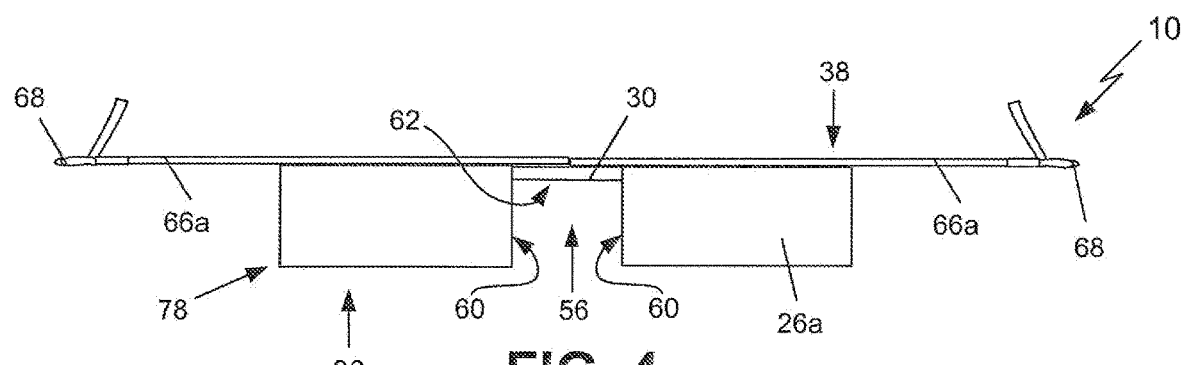
FIG. 4 is a top view of the inflatable clamping apparatus of FIG. 1.
Figure 5:
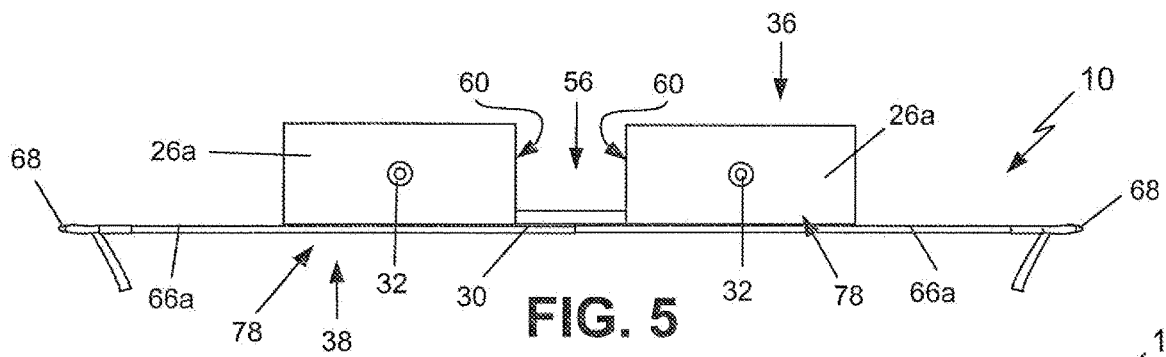
FIG. 5 is a bottom view of the inflatable clamping apparatus of FIG. 1.

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular configurations for components of the apparatus and system of the present invention, including the elongated members and objects with which the apparatus of the present invention are utilized, persons who are skilled in the relevant art will readily appreciate that the present invention and the components with which the invention can be utilized are not so limited. For instance, the new apparatus and system can comprise different types, sizes and shapes of bladders, connecting section, straps and the like and the present invention can be utilized with different types and configurations of elongated members and/or objects. In addition, the exemplary embodiments of the present device are shown and described with only those components which are required to disclose the present invention. As such, many of the necessary components for manufacturing and using the present invention are not shown in the drawings or necessarily described below, but which are well known to persons who are skilled in the relevant art. As will be readily appreciated by such persons, the various elements of the present invention that are described below may take on any form consistent with forms which are readily realized by one of ordinary skill in the art having knowledge of air-filled bladders, straps and systems for supportedly attaching an object to an elongated structure.

A new inflatable clamping apparatus that is configured pursuant to one of the preferred embodiments of the present invention is shown generally as 10 in FIGS. 1-13. A system utilizing the inflatable clamping apparatus 10 (also referred to as the "clamping apparatus 10") that is configured pursuant to a preferred embodiment of the present invention is shown generally as 12 in FIG. 14. As shown in these figures and set forth in more detail below, the new clamping apparatus 10 and system 12 of the present invention are structured and arranged to securely attach an object 14 to an elongated member 16 so the object 14 can be beneficially seen and/or utilized by the user and others. The clamping apparatus 10 and system 12 of the present invention allows a user to securely support one or more objects 14 on an elongated member 16 in a manner that is easy to attach and detach from the elongated member 16 and which, while attached, will prevent the clamping apparatus 10 and object 14 from moving relative to the elongated member 16 until desired by the user. As set forth in more detail below, the new clamping apparatus 10 and system 12 functions as an air clamp that, when filled with air, tightly engages and at least partially envelopes an elongated member 16 in a manner which prevents the clamping apparatus 10, as well as any object 14 that is attached thereto, from becoming loose or disengaged from the elongated member 16 until the user releases air from the clamping apparatus 10.

A wide range of different types of objects 14 can be utilized with the clamping apparatus 10 and be part of the system 12 of the present invention. A number of such objects 14 are described in the Background above, all of which are incorporated herein as though fully set forth in the Detailed Description. Such objects 14 include a basketball backboard, shown as 14a in FIGS. 10-11, and signs 14b in FIGS. 12-13. Other objects 14 include restraint devices to hold an animal, boat or other item in place, decorations for holidays, lights or a wide variety of different objects 14 that can benefit the user and/or others by being seen and/or utilized. Although certain objects 14 are described in the text or shown in the figures included herewith, these are included for exemplary purposes only. As such, the scope of the present invention is not limited to the types of objects 14 described or shown herein. In fact, as will be readily appreciated by persons who are skilled in the relevant art, the clamping apparatus 10 and system 12 of the present invention can be beneficially utilized with a nearly infinite number of different types, sizes and shapes of objects 14 to secure such objects 14 to a wide variety of different elongated members 16.

With regard to an object 14 that is configured as a backboard 14a or a sign 14b which is beneficially utilized, as shown in FIGS. 10-14, with the clamping apparatus 10 and system 12 of the present invention, the clamping apparatus 10 will hold these objects 14 on an elongated member 16 so they can be utilized and/or seen by the user and others. Both the backboard 14a and the sign 14b have a front surface 18 and a back surface 20 that are sized and configured to accomplish the objectives of the purposes for which these objects 14 are selected. The front surface 18 of the backboard 14a has a basketball rim 22 and a basketball net 24 attached thereto and extending outward therefrom for the purposes of playing basketball or basketball-related activities. For purposes of the clamping apparatus 10 and system 12 of the present invention, the object 14 can be either the backboard 14a alone or the combination of the backboard 14a and basketball rim 22 or the combination of the backboard 14a, basketball rim 22 and basketball net 24. The front surface 18 of the sign 14b is utilized to display a message, such as traffic-related message, parking or no parking message, directional message, informational message and a wide variety of other information (for purposes of showing the sign 14b in use with the present invention, a no parking message is shown on the sign 14b in FIG. 12. Persons who are skilled in the relevant art will readily appreciate that any message or other information can be placed anywhere on the front surface 18 and/or back surface 20 of the object 14.

As set forth above, the clamping apparatus 10 of the present invention is structured and arranged to securely and supportedly mount an object 14 on an elongated member 16. A wide variety of members, structural components and other items can be utilized as the elongated member 16 for use with the clamping apparatus 10 and system 12 of the present invention. For instance, the elongated member 16 can be a pole, post, beam, tree trunk, tree limb or virtually any other item to which the user may want to securely attach an object 14 to in order to allow the user and/or others to utilize the object 14 or to position the object 14 so the user and/or others can benefit from seeing the object 14 on the elongated member 16. In the drawings, the elongated member 16 is shown as a vertical pole 16a in FIGS. 10-11 and a horizontal beam in FIGS. 12-13. As with object 14, although certain elongated members 15 are described in the text or shown in the figures included herewith, these are included for exemplary purposes only. As such, the scope of the present invention is not limited to the types of elongated members 16 described or shown herein. In fact, as will be readily appreciated by persons who are skilled in the relevant art, the new clamping apparatus 10 and system 12 of the present invention can be beneficially utilized with a nearly infinite number of different types, sizes and shapes of elongated members 16 to which an object 14 can be secured to allow the object 14 to be beneficially utilized and/or seen by the user and/or others.

In one of the preferred embodiments of the present invention, the new inflatable clamping apparatus 10 of the present invention generally comprises one or more pneumatic bladders 26 that each have or define an air chamber 28 inside, a connecting section 30 disposed between two areas of a single bladder 26 or a pair of bladders 26, an apparatus connecting mechanism 32 that is attached to the one or more bladders 26 and/or connecting section 30 that connects the clamping apparatus 10 to the object 14 to secure the object 14 to an elongated member 16, and an air valve 34 associated with each of the one or more bladders 26 to allow the user or others to fill the air chamber 28 with air for use and to deflate the air chambers 28 for ease of transport, handling and storage, as best shown in FIGS. 1-9. The configuration and function of these components are described in more detail below and shown in use in FIGS. 10-13. The bladders 26 define a front surface 36, a back surface 38, a top end 40, a bottom end 42, a first or left side 44 and a second or right side 46 of the clamping apparatus 10, as also best shown in FIGS. 1-9 and 15-16. In many uses of the new clamping apparatus 10 and system 12, but not all, an elongated member 16 that is configured as a pole or post 16a will be mounted in or otherwise supported by or on a support surface 48, such as the ground or a court, patio, driveway, street or the like. In such situations, the bottom end 42 of the clamping apparatus 10 will, usually, be positioned above the support surface 48 to hold the object 14 on or above the support surface 48.

Figure 7:
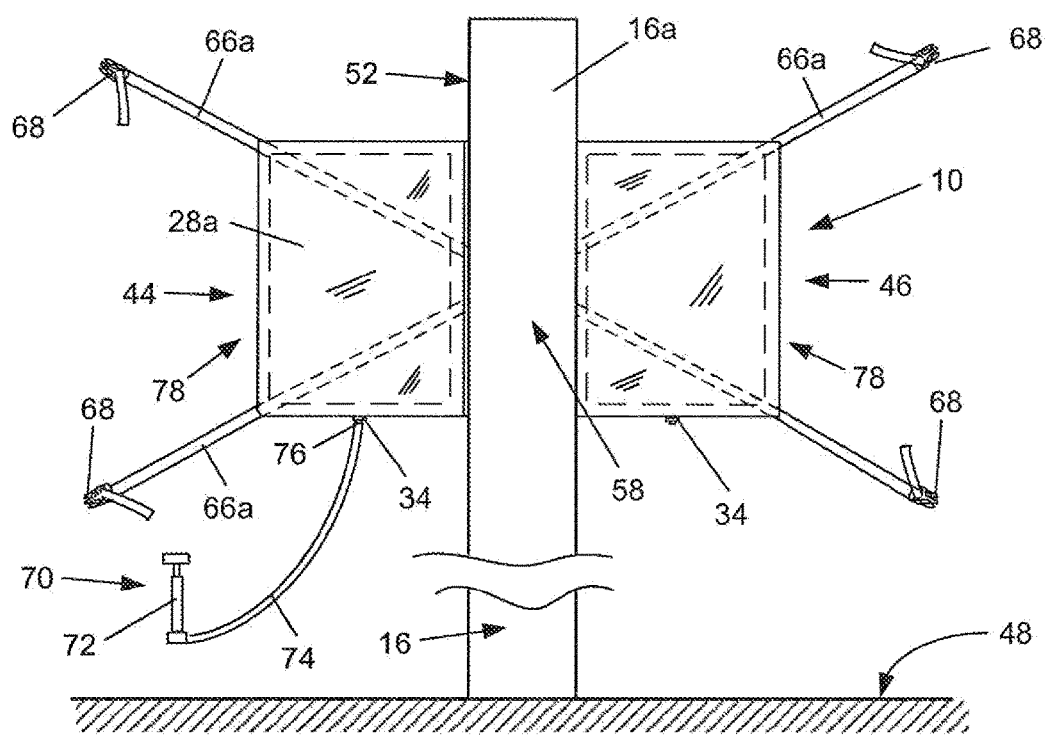
FIG. 7 is a front view of the inflatable clamping apparatus of FIG. 1 shown with the bladders securely attached to an elongated member that extends upward from a surface.
Figure 8:
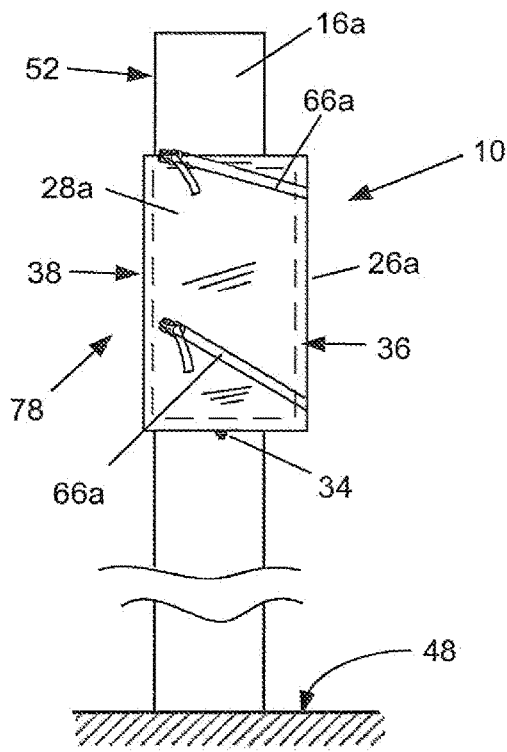
FIG. 8 is a right side view of the inflatable clamping apparatus and elongated member of FIG. 7.
Figure 9:
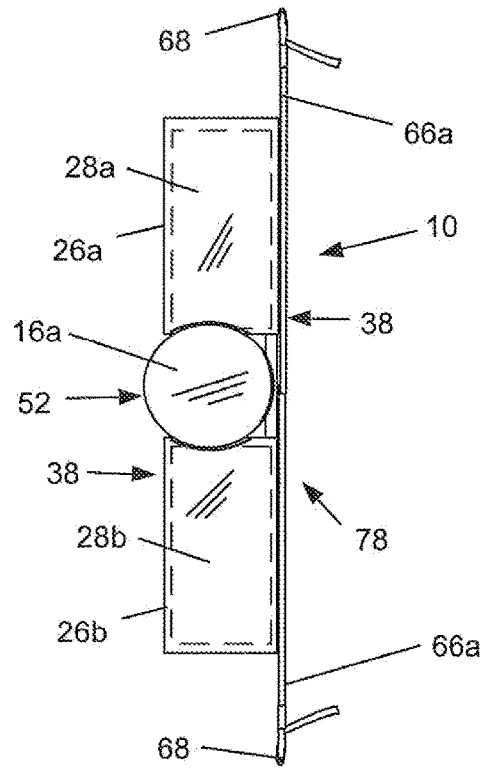
FIG. 9 is a top view of the inflatable clamping apparatus and elongated member of FIG. 7.
Figure 10:
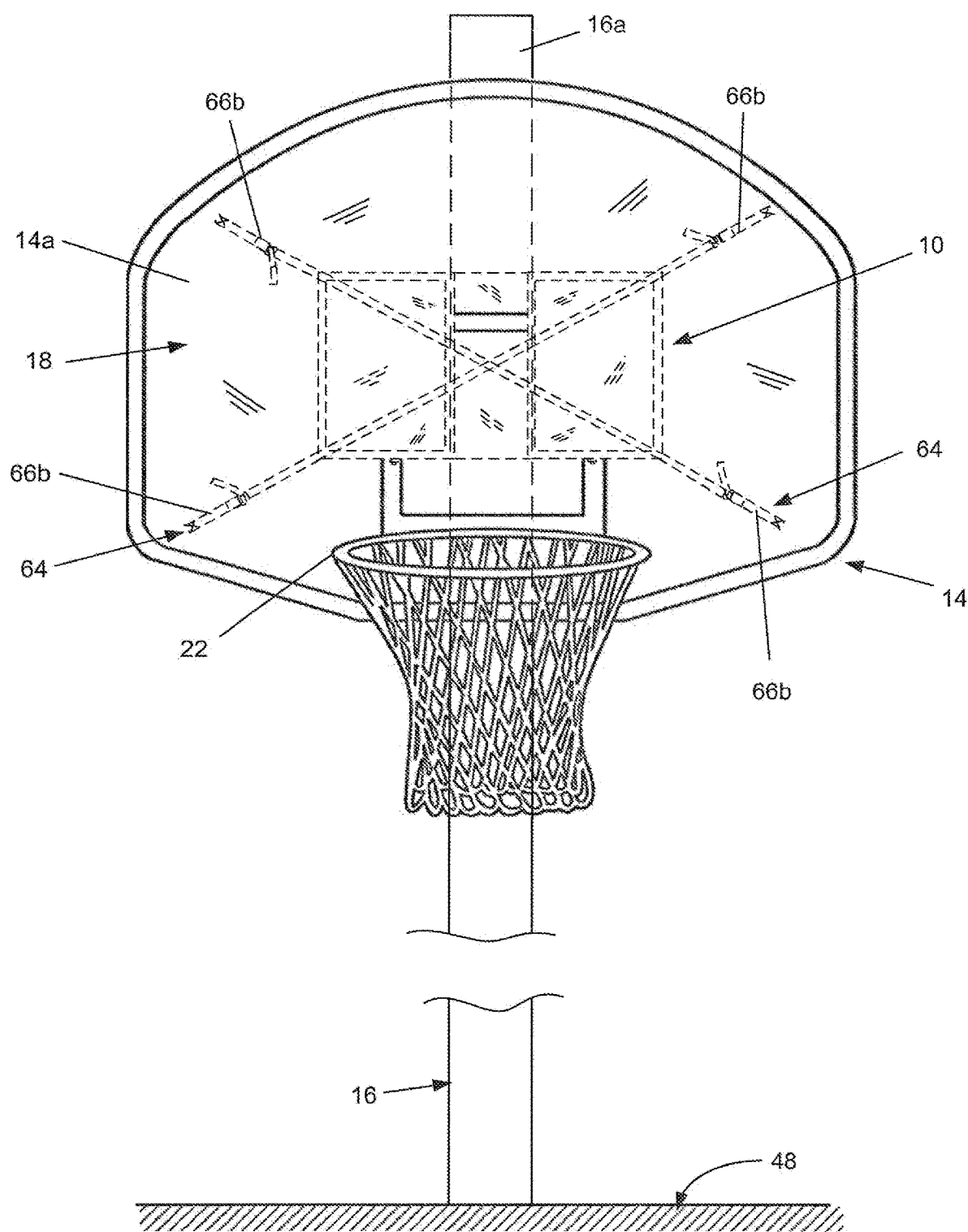
FIG. 10 is a front view of the inflatable clamping apparatus and elongated member of FIG. 7 shown with the apparatus securing an object to the elongated member, with the object comprising a basketball backboard with a rim and net attached to the backboard.
Figure 11:
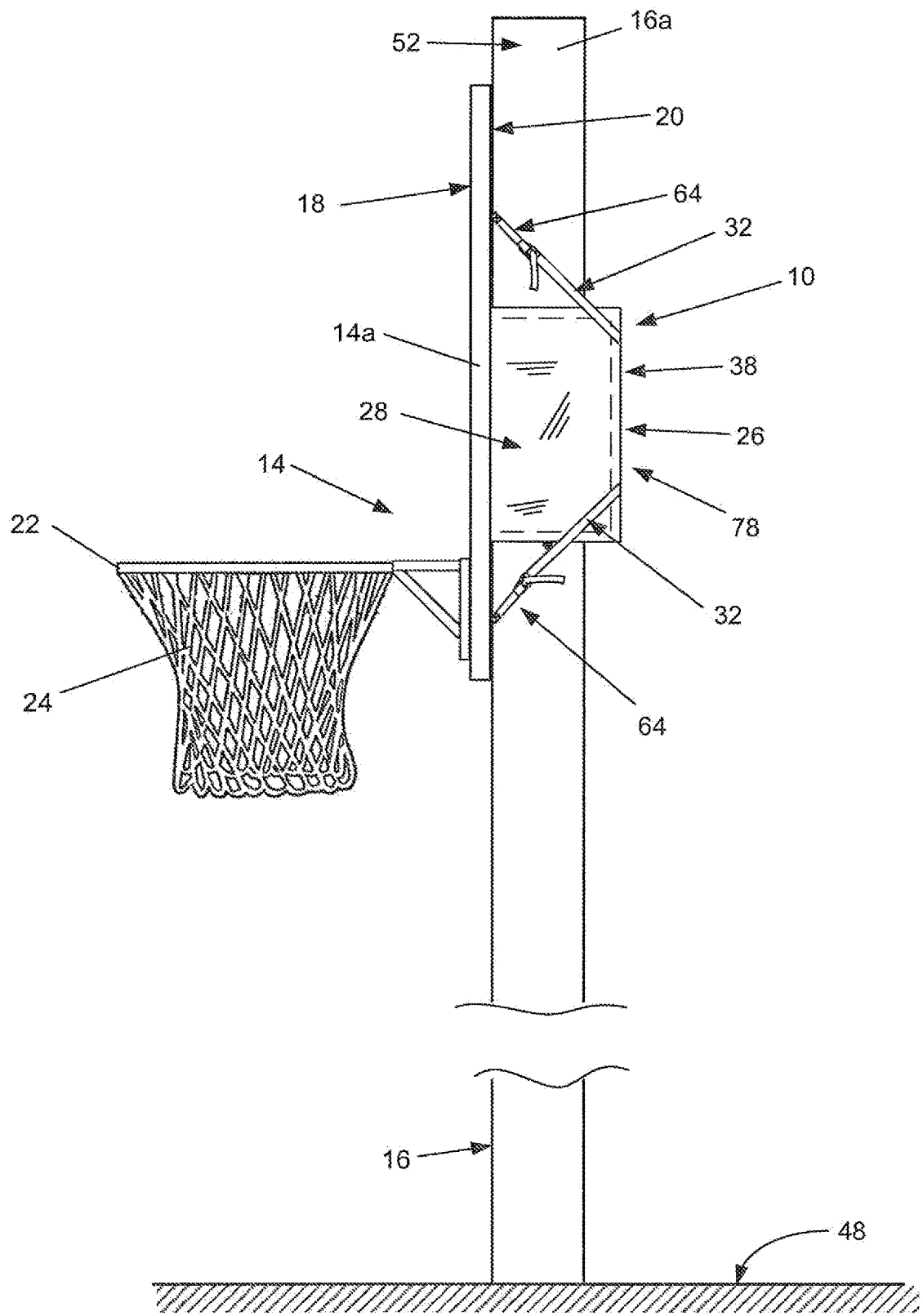
FIG. 11 is a right side view of the inflatable clamping apparatus, elongated member and object of FIG. 10.
Figure 12:
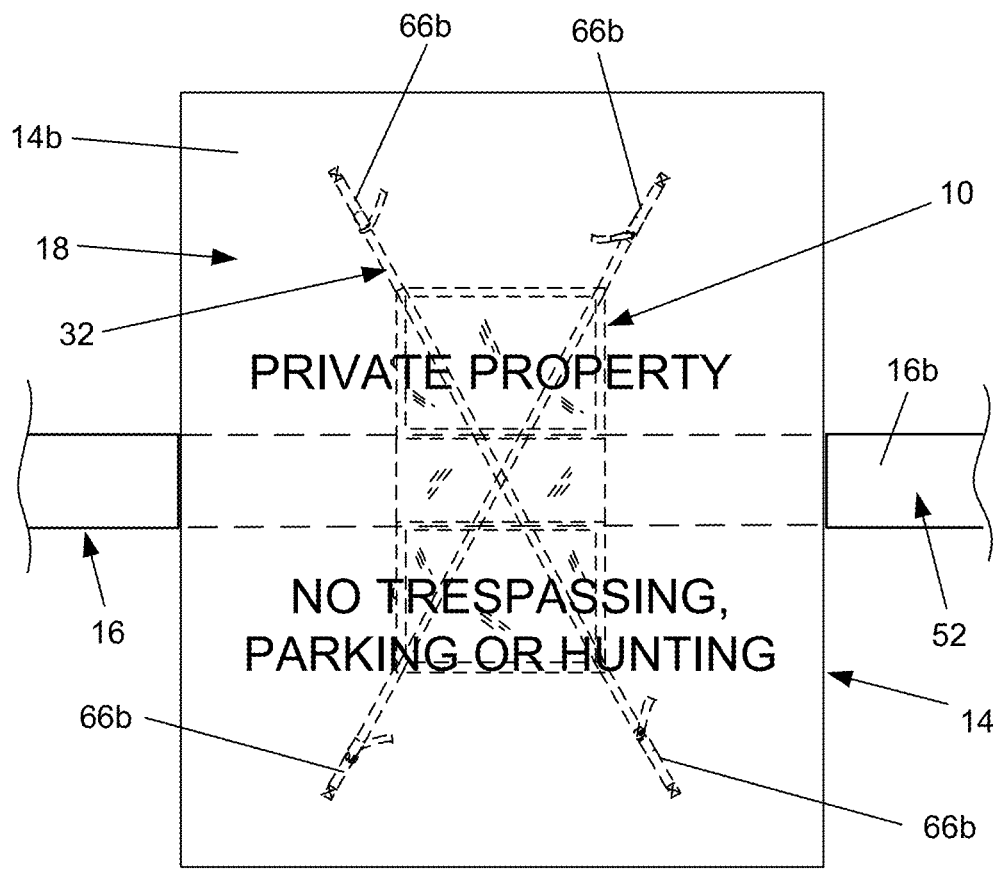
FIG. 12 is a front view of the inflatable apparatus of FIG. 1 shown attached to an elongated member configured as a horizontal beam.
Figure 13:
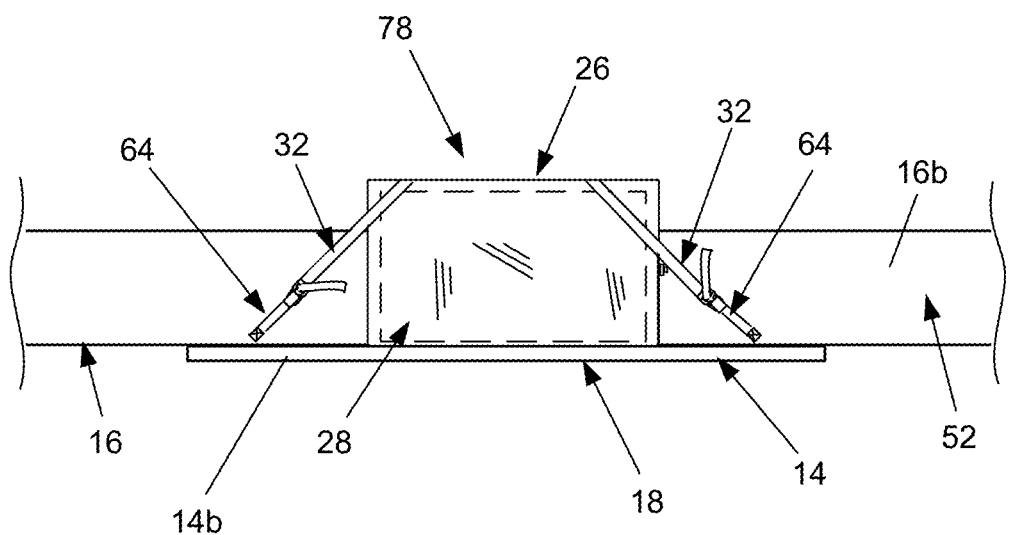
FIG. 13 is a top view of the inflatable apparatus and elongated member of FIG. 12.

For purposes of describing the use and relative location of the various components and use of the clamping apparatus 10 and system 12 of the present invention, the terms "front", "forward", "forwardly" and the like are utilized to refer to or toward the clamping apparatus 10 that is generally facing toward the viewer in FIGS. 1 and 7 who would also be viewing the basketball backboard 14a or sign 14b (as objects 14) in FIGS. 10 and 12. Likewise, the terms "back", "rearward", "rearwardly" and the like are utilized to refer to or toward the direction generally facing the toward the viewer in FIG. 3 and is typically behind the object 14 and elongated member 16 when the object 14 is attached to the elongated member 16 as shown in FIGS. 10-13. The terms "up", "upper", "upward", "upwardly", "top" and the like refer to the direction of or toward the end of the clamping apparatus 10 generally positioned away from support surface 48 when in use with a pole or post 16a and the terms "down", "downward", "downwardly", "lower", "bottom" and the like refer to the direction of or toward the support surface 48, as best shown in FIGS. 7-8 and 10-11.

Each of the one or more bladders 26, namely, the first/left bladder 26a and the second/right bladder 26b in a preferred embodiment shown in the figures, are structured and arranged to comprise, typically by defining or enclosing, one or more air chambers 28, such as air chambers 28a and 28b, inside the bladders 26, as best shown in FIGS. 1, 7-8 and 10-13. The bladders 26 have an outer surface 50 that is generally selected to engage an outer surface 52 of the elongated member 16 to which the clamping apparatus 10 will be attached and, as may be desired, the back surface 20 of an object 14. In addition, in most configurations, it is preferable that the outer surface 50 of the bladders 26 be made out of materials that are sufficiently durable to be used outside so the bladders 26 will not be easily damaged by the sun, rain, snow, hail and other environmental circumstances and will be impermeable to water, whether the water is from rain or melting snow or a hose, wash cloths and the like used for cleaning the clamping apparatus 10. In addition, it is also preferable that the outer surface 50 of the bladders 26 be made of materials that will not be easily punctured by tree limbs or branches, projectiles, persons (e.g., fingernails) and the like. As such, it is preferred that the materials for the outer surface 50 of the bladders 26 be selected to provide a clamping apparatus 10 product that is intended to be utilized in a wide variety of different situations and able to provide relatively long use of the clamping apparatus 10 and system 12 for its intended use.

Figure 15:
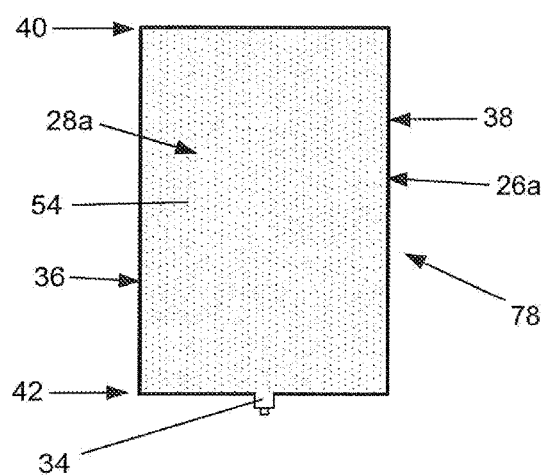
FIG. 15 is a cross-sectional view of the left bladder of FIG. 1, shown without the apparatus connecting mechanism, showing the enclosure for the left air chamber configured as being integral with the bladder.
Figure 16:
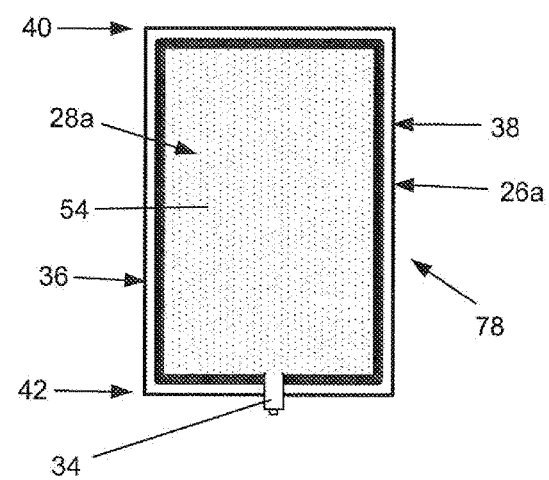
FIG. 16 is a cross-sectional view of a left bladder of an inflatable clamping apparatus that is configured according to a second embodiment of the present invention showing the left air chamber configured as being a separate inflatable component inside the bladder.

In one configuration, which is likely to be preferred, the materials for the outer surface 50 of the bladders 26 are also selected to be pneumatically impermeable so as to prevent pressurized air 54 (as set forth in the chart of FIG. 14 and FIGS. 15-16) from flowing out of the air chamber 28 to the environment through the bladders 26 from the air chambers 28. In this configuration, the air chambers 28 are defined by the outer surface 50 of the bladders 26, such that the outer surface 50 of the bladders 26 function as both the contact points against the outer surface 52 of the elongated member 16 and the impermeable outer shell of the air chambers 28 in the bladders 26 (such as is common for balloons, tire tubes and the like), as shown in FIG. 15. In another configuration, the air chambers 28 are a separate component from the bladders 26 such that the bladders 26 function more like an outer cover for the air chambers 28, as shown in FIG. 16, to protect them from damage. In this configuration, the bladders 26 would not need to be impermeable to air, due to the pressurized air 54 being enclosed by the material for the inner disposed air chamber 28 (e.g., such as is common for tires that enclose an inner tube or the like). However, though not entirely necessary, in this second configuration, it is still likely to be preferred that the bladders 26 be at least generally impermeable to water to prevent moisture inside the bladders 26 causing damage to the air chambers 28. In either configuration, it is important that the air chambers 28 be configured such that the pressurized air 54 placed inside the air chambers 28, through the air valves 34, not be allowed to escape therefrom so the bladders 26 will remain inflated when in the clamping apparatus 10 is in use with an elongated member 16 or as otherwise desired by the user. As set forth in more detail below, during use of the clamping apparatus 10 and system 12 of the present invention, the air chambers 28 are filled with pressurized air 54 to inflate the air chambers 28 and expand the bladders 26 to the point that the bladders 26 tightly engage a portion of the elongated member 16 which is at the connecting section 30 of the clamping apparatus 10 to securely mount the clamping apparatus 10 and any object 14 that is attached thereto by apparatus connecting mechanism 32, as shown in FIGS. 10-13. Flexible rubber, plastic and the like are likely to be suitable as the air impermeable material for either the bladders 26 (in the first configuration) or the air chambers 28 (in the second configuration).

The connecting section 30 is a relatively narrower portion of the clamping apparatus 30 that defines a member receiving area 56 that is sized and configured to receive a bladder engaging section 58 of the elongated member 18, with the bladder engaging section 58 being that portion of the elongated member 18 against which the bladders 28 will tightly press against to secure the clamping apparatus 10 to the elongated member 18 during use of the clamping apparatus 10 and, typically, the object 14. In one embodiment of the new clamping apparatus 10, there is one bladder 26 that has two enlarged areas which are interconnected, both physically and pneumatically, with the narrower connecting section 30 such that the pressurized air 54 will flow between the enlarged bladder areas of the bladder 26 and the connecting section 30 to inflate and expand the bladder 26 to tightly engage the bladder engaging section 58 of the elongated member 18 in the member receiving area 56. In another embodiment of the clamping apparatus 10, which is likely to be a preferred embodiment, the connecting section 30 is a separate component that is attached to or integral with a pair of bladders 26 (e.g., first/left bladder 26a and second/right bladder 26b) to interconnect the bladders 26a/26b and define or provide the member receiving area 56 that receives the bladder engaging section 58 of the elongated member 18, which embodiment is best shown in FIGS. 2-9. In this embodiment, is not likely to be necessary that the pressurized air 54 flow through or be placed in the connecting section 30. As with the engaging sides 60 of the bladders 26a and 26b, which with the connecting section 30 define the member receiving area 56 of the clamping apparatus 10, the engaging side 62 of the connecting section 30 should be made out of a durable, strong and not easily damaged material that is selected to be placed in tight engagement with the bladder engaging section 58 of the elongated member 16, which could be a power pole or other type of elongated member 16 that has a rough, non-smooth outer surface 52. In one configuration, the entire outer surface 50 of the bladders, including the engaging sides 60/62 thereof, are made out of such a material. In another configuration, only the engaging sides 60/62 are made out of or are covered with the specially selected material, such that the engaging sides 60/62 are covered with the material. As set forth in more detail below, in any configuration, the connecting section 30 forms part of the back surface 38 of the generally U-shaped or C-shaped configuration of the clamping apparatus 10 that, when inflated, tightly engages the elongated member 16 to secure the clamping apparatus 10 and, if utilized, the object 14 to the elongated member 16.

The apparatus connecting mechanism 32 is utilized to securely attach the clamping apparatus 10 to the object 14 to secure both the clamping apparatus 10 and the object 14 to the elongated member 16, as best shown in FIGS. 10-13. To accomplish the foregoing objective, the apparatus connecting mechanism 32 is structured and arranged to securely connect to an object connecting mechanism 64 associated with the object 14. As such, the apparatus connecting mechanism 32 and the object connecting mechanism 64 are cooperatively configured to be able to engagedly connect to each other when the clamping apparatus 10 and object 14 are secured to the elongated member 16. In the embodiment of the present invention shown in the figures, both the apparatus connecting mechanism 32 and the object connecting mechanism 64 comprises a pair of elongated linking members 66, such as straps, that have a cooperatively configured connectors 68, such as a buckle assembly, that securely attaches the linking members 66a of the apparatus connecting mechanism 32 with the linking members 66b of the object connecting mechanism 64, as best shown in 10-13. In one configuration, the buckle assembly connectors 68 are quick release strap buckles (which is also referred to as a side release buckles) that comprise a buckle and a tongue or (latch plate) that is sized and configured to be securely received in the buckle. The configuration and use of this type of buckle assembly (connector 68) is well known to persons who are skilled in the relevant art. Alternatively, a wide variety of different types and configurations of linking members 66 and connectors 68 can be utilized as part of the cooperatively configured apparatus connecting mechanism 32 and object connecting mechanism 64. For instance, the linking members 66 can be ropes, strings, bungee cords and the like can be and the connectors 68 can be other types of buckle assemblies, hook and hook engaging members (e.g., eye bolts and the like) or other types of connecting devices, such as snaps, buttons, velcro, magnetic components and the like. The linking members 66 and connectors 68 need to be chosen to have sufficient strength and durability to achieve the objectives of both the clamping apparatus 10 and system 12 of the present invention. As will be readily appreciated by persons who are skilled in the relevant art, virtually any type of components that will allow the clamping apparatus 10 securely connect to the object 14 are likely to be suitable for use with the clamping apparatus 10 and system 12 of the present invention. In the preferred embodiments, the linking members 66 are elongated and are adjustable in length to allow the user to utilize, as described below, a single clamping apparatus 10 with different shapes and sizes (e.g., diameter or width) of elongated members 16 and the connectors 68 is chosen to securely connect, but preferably easy to disconnect, the linking members 66a of the apparatus connecting mechanism 32 to the linking members 66b of the object connecting mechanism 64. As will also be readily understood by persons who are skilled in the relevant art, failure of the linking members 66 and/or connectors 68 to join the two connecting mechanisms 32/64 together will prevent the clamping apparatus 10 from securely holding the object 14 on the elongated member 16.

To fill the air chambers 28 with pressurized air 54, each air chamber 28 has one or more air valves 34 associated therewith that are structured and arranged to receive pressurized air 54 into the air chambers 28 to inflate the air chambers 28 and expand the bladders 26 so the engaging sides 60 of the bladders 26 and the engaging side 62 of the connecting section 30 in the member receiving area 56 of the clamping apparatus 10 will tightly press against, tightly and securely engage the apparatus engaging section 58 of the elongated member 16 to hold the clamping apparatus 10 and object 14 on the elongated member 16, as shown in FIGS. 7-13. In one of the preferred embodiments of the present invention, the air valves 34 are the self-closing type that open to allow pressurized air 54 to flow into the one or more air chambers 28 and close to prevent the pressurized air 54 from flowing out of the air chambers 28 until desired by the user. In other embodiments, the air valves 32 can be of the type which are manually or otherwise operated by the user to fill the air chambers 28 with pressurized air 54 or to release pressurized air 54 therefrom. As will be readily appreciated by persons who are skilled in the relevant art, a wide variety of air valves 32 can be utilized with the clamping apparatus 10 of the present invention to add or remove pressurized air 54 from the air chambers 28. The configuration and use of such air valves 32 are generally well known to persons who are skilled in the relevant art.

Figure 6:
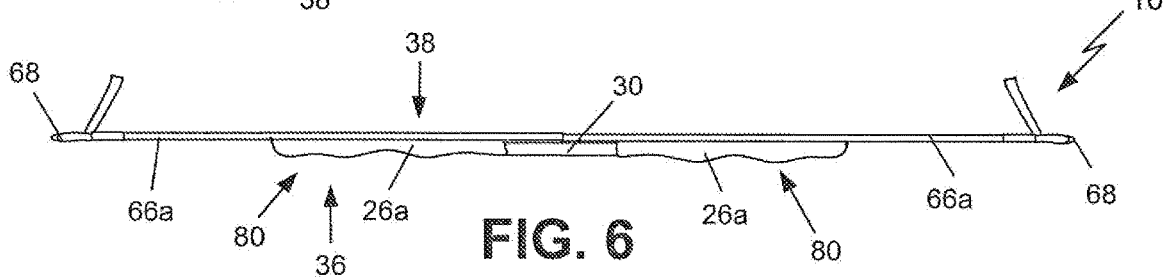
FIG. 6 is a top view of the inflatable clamping apparatus of FIG. 4 with the bladders shown in their deflated condition.

In one configuration, the air valves 32 are structured and arranged to allow the user to blow air into the air chambers 28 using his or her mouth to inflate the air chambers 28 and expand the bladders 26 to tightly engage the apparatus engaging section 58 of an elongated member 16. In the preferred embodiments, however, the system 12 of the present invention comprises an air filling mechanism 70 that is structured and arranged to add pressurized air 54 into the air chambers 28. In some configurations, the air filling mechanism 70 is structured and arranged to also pressurize air to product the pressurized air 54 itself. For instance, the air filling mechanism 70 can be a hand pump 72, which is configured to pressurize ambient air, having an air hose 74 with and a valve connector 76 that is structured and arranged to connect to the air valves 34 and transfer pressurized air 54 into the air chambers 28. In other configurations, the air filling mechanism 70 can be an electronic, pneumatic or other air pressurizing device, also with an air hose 74 and valve connector 76, that produces the pressurized air 54 for the air chambers 28. For some configurations, the air filling mechanism 70 can include a tank for storing pressurized air 54 therein until it is needed to fill the air chambers 28 with pressurized air 54 and expand the bladders 26 to place the bladders 26 in their inflated condition 78, as shown in FIGS. 1-5 and 7-13, so the bladders 26 will tightly engage the elongated member 16. The air filling mechanism 70 can be configured to assist the user removing pressurized air 54 from the air chambers 28 to place the bladders 26 in their deflated condition 80, as shown in FIG. 6. In some configurations, as may be desired by the user and/or manufacturer, the air filing mechanism 70 can be attached to or otherwise part of the bladders 26 so they are readily available to add pressurized air 54 to and remove pressurized air 58 from the air chambers 28 to place the bladders 26 in, respectively, the inflated condition 78 or deflated condition 80. As will be readily appreciated by persons who are skilled in the relevant art, a wide variety of different types of air filling mechanisms 70 can be utilized as part of the system 12 of the present invention.

Figure 14:
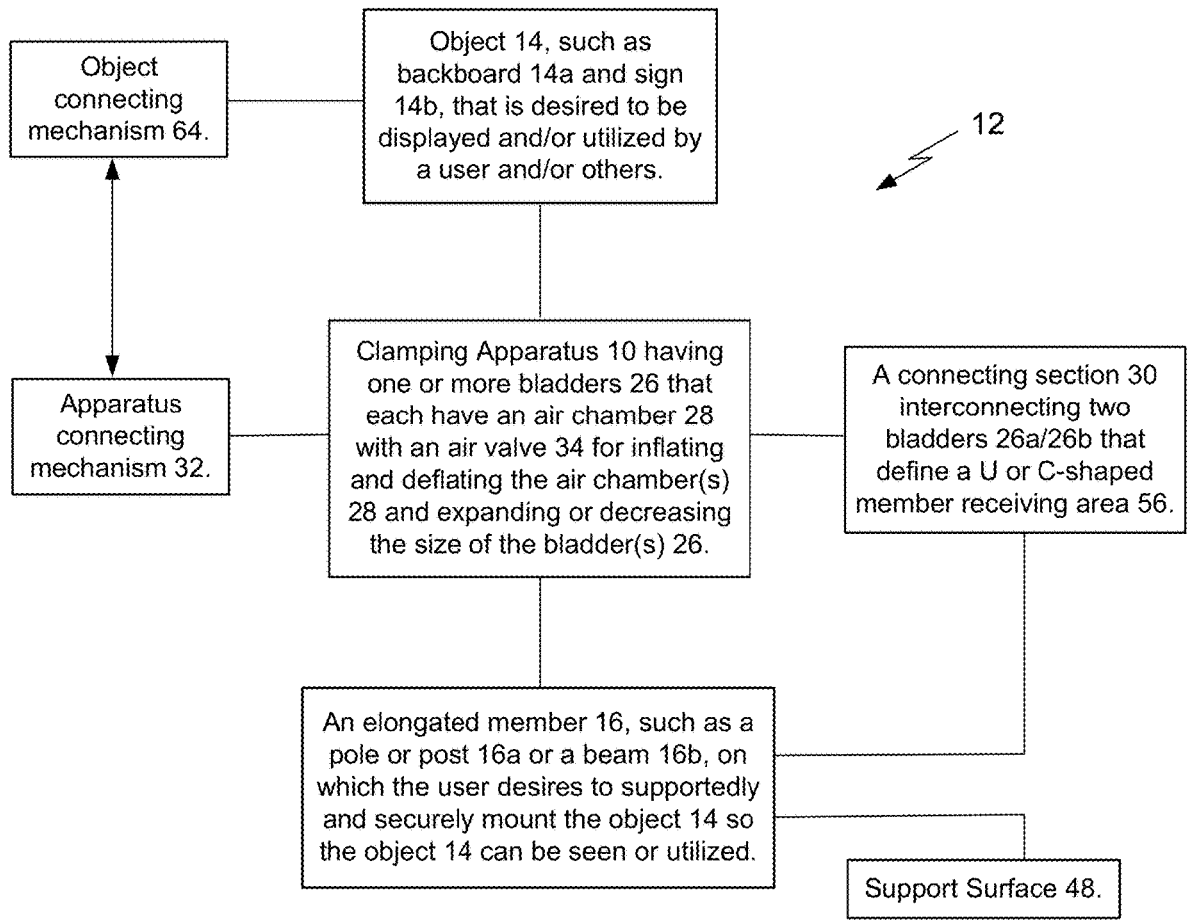
FIG. 14 is a chart showing a system configured according to one of the preferred embodiments of the present invention, with the system utilizing the inflatable apparatus of FIG. 1.

As set forth in FIG. 14, the new system 12 of the present invention generally comprises the clamping apparatus 10 described above, an object 14 to which the clamping apparatus 10 will attach for purposes of displaying and/or using the object 14, an elongated member 16 on which the object 14 will be mounted, attached or otherwise securely supported, an object connecting mechanism 64 that is utilized to attach the object 14 to the clamping apparatus 10, and an air filling mechanism 70 to direct pressurized air 54 into the clamping apparatus 10 to place the bladders 26 in their inflated condition 78 engage the clamping apparatus 10 with the elongated member 16. Specifically, the system 12 interactively combines these various components to provide the ability to easily, quickly and securely attach an object 14 to an elongated member 16 in a manner which tightly holds the clamping apparatus 10 on the elongated member 16 with the object 14 securely attached to the clamping apparatus 10. The clamping apparatus 10 has bladders 26 with air chambers 28 that are filled with pressurized air 54 using the air filling mechanism 70 to direct pressurized air 54 through the air valves 34 to expand the bladders 26 so the member receiving area 56 thereof will tightly press against the bladder engaging section 58 of the elongated member 16 to securely attach the object 14 to the elongated member 16 for display and/or use of the object 14, as best shown in FIGS. 7-13. When the air chambers 28 of the clamping apparatus 10 are filled with pressurized air 54 so as to be in their inflated condition 78, the engaging sides 60 of the member receiving area 56 of the bladders 26 and typically the engaging side 62 of the connecting section 30, press against the outer surface 52 of the elongated member 16 at the bladder engaging section 58 thereof to tightly squeeze the bladders 26 against the elongated member 16 and, therefore, secure the clamping apparatus 10 to the elongated member 16.

To use the new clamping apparatus 10 to display and/or utilize an object 14 on an elongated member 16, the user gathers the clamping apparatus 10, the object 14 having an object connecting mechanism 64, and an air filling mechanism 70, and approaches the elongated member 16. The user then wraps the clamping apparatus 10 around the elongated member 16 with the member receiving area 56 of the clamping apparatus 10 around the outer surface 52 of a portion of the elongated member 16. The user then connects each of the object connecting mechanisms 64 to the apparatus connecting mechanism 32 associated with the clamping mechanism 10, leaving sufficient slack between the elongated member 16 and the combined clamping mechanism 10 and object 14 so the clamping mechanism 10 and object 14 can slide up the elongated member 16 to where the user will want the object 14 to be positioned, which will be the bladder engaging section 58 of the elongated member 16. Once the object 14 is at the desired location (e.g., height for a basketball backboard 14a), the fills the air chambers 28 inside the bladders 26 with pressurized air 54 to expand the bladders 26 to their inflated condition 78. The pressurized air can be provided by the user using his or her mouth to blow air through the air valves 34 or, likely preferred, utilize an air filling mechanism 70 to pump pressurized air 54 into the air chambers 28. As the bladders 26 expand, the member receiving area 56 of the clamping mechanism 10 engage and tightly press against the bladder engaging section 58 of the elongated member 16 to secure the clamping mechanism 10 and object 14 to the desired location of the elongated member 16. When the object 14 is no longer needed or desired for display and/or use, the user merely releases pressurized air 54 from the air chambers 18 of the clamping apparatus 10 to place it in or at least partially in its deflated condition 80, lowers, slides or otherwise moves the object 14 and clamping apparatus 10 into position so as to be able to easily access these components, disconnects the object 14 from the clamping apparatus 10 and removes the clamping apparatus 10 from the elongated member 16. As desired, the clamping apparatus 10 and object 14 can be moved to a different elongated member 16 and then be ready to be utilized for the same or a different display or utilization purpose.

As set forth above, the various components of the new clamping apparatus 10 and system 12 are subject to a number of possible modifications that will still fall within the scope of the present invention. In particular, the size and shape of the various components of the clamping apparatus 10, object 14 and elongated member 16 can be different than described above and shown in the figures. Likewise, the clamping apparatus 10 and system 12 can be utilized with a wide variety, in fact virtually unlimited, of different types of objects 14 to secure the object 14 to a wide variety, also virtually unlimited, of different types of elongated members 16. Any such alternative configurations and/or arrangements of the components of the clamping apparatus 10 and to the object 14 and/or elongated member 16 will be generally well known to persons who are skilled in the relevant art, including persons who will benefit from displaying or using objects 14 and persons who manufacture such objects 14. In addition, the components of the new clamping apparatus 10 and system 12 can be made out a wide variety of different materials. In the preferred embodiments of the present invention, the clamping apparatus 10 and system 12 are relatively easy to install and use and are likely to be relatively inexpensive to manufacture, thereby making the new clamping apparatus 10 and system 12 widely available for purchase and use.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A clamping apparatus for securely supporting an object on an elongated member, said apparatus comprising:
    one or more bladders, each of said one or more bladders having an air chamber therein, said one or more bladders defining a front surface and a back surface of said clamping apparatus;
    a member receiving area associated with said one or more bladders that is sized and configured to receive a bladder engaging section of the elongated member therein;
    an air valve associated with each of said one or more bladders so as to allow pressurized air to be received in and released from each of said air chambers to place said bladders in, respectively, one of an inflated condition to expand said one or more bladders and a deflated condition to reduce the size of said one or more bladders; and
    an apparatus connecting mechanism associated with at least one of said one or more bladders, said apparatus connecting mechanism structured and arranged to securely attach to the object and associate the object with said clamping apparatus,
    wherein when the bladder engaging section of the elongated member is in said member receiving area and each of said one or more bladders are in said inflated condition, said one or more bladders will tightly engage the elongated member to securely attach said clamping apparatus to the elongated member with the object at or against said front surface of said clamping apparatus so as to display or utilize the object when the object is attached to said clamping apparatus by said apparatus connecting mechanism.

2. The clamping apparatus of claim 1, wherein said clamping apparatus comprises at least a first bladder and a second bladder that both sized and configured to define said member receiving area has having engaging sides associated with each of said first bladder and said second bladder that will tightly engage the bladder engaging section of the elongated member when the bladder engaging section of the elongated member is in said member receiving area and each of said bladders are in said inflated condition.

3. The clamping apparatus of claim 2 further comprising a connecting section interconnecting said first bladder and said second bladder, said connecting section further defining said back surface of said clamping apparatus.

4. The clamping apparatus of claim 3, wherein said first bladder, said second bladder and said connecting section define said member receiving area as having one of a generally U-shaped or C-shaped configuration.

5. The clamping apparatus of claim 3, wherein said connecting section has an engaging side that engages the elongated member when the bladder engaging section thereof is in said member receiving area so as to further secure said clamping apparatus to the elongated member.

6. The clamping apparatus of claim 5, wherein said first bladder, said second bladder and said connecting section define said member receiving area as having one of a generally U-shaped or C-shaped configuration.

7. The clamping apparatus of claim 1, wherein the object has a front surface and a back surface and each of said one or more bladders are structured and arranged to press against the back surface of the object so as to allow display or use of the front surface of the object when the object is attached to said one or more bladders by said apparatus connecting mechanism and said one or more bladders are in said inflated condition.

8. The clamping apparatus of claim 1, wherein said apparatus connecting mechanism is structured and arranged to engage one or more object connecting mechanisms associated with the object to securely attach the object to the clamping apparatus.

9. The clamping apparatus of claim 8, wherein said apparatus connecting mechanism and said object connecting mechanism are cooperatively configured so as to securely engage each other to securely hold the object to the clamping apparatus.

10. The clamping apparatus of claim 1, wherein said air valves are structured and arranged to connect to an air filling mechanism to direct the pressurized air into each of said air chambers and place each of said one or more bladders in said inflated condition.

11. A clamping apparatus for securely supporting an object on an elongated member, said apparatus comprising:
    a first bladder having a first air chamber;
    a second bladder having a second air chamber, said first bladder and said second bladder defining a front surface and a back surface of said clamping apparatus;
    a connecting section interconnecting said first bladder and said second bladder, said connecting section further defining said back surface of said clamping apparatus;
    a member receiving area defined by said first bladder, said second bladder and said connecting section, said member receiving area sized and configured to receive a bladder engaging section of the elongated member therein;
    an air valve associated with said first air chamber of said first bladder;
    an air valve associated with said second air chamber of said second bladder, said first air valve and said second air valve both configured to allow pressurized air to be received in and released from, respectively, said first air chamber and said second air chamber to place each of said first bladder and said second bladder in, respectively, one of an inflated condition to expand said first bladder and said second bladder and a deflated condition to reduce the size of said first bladder and said second bladder; and
    an apparatus connecting mechanism associated with at least one of said first bladder and said second bladder, said apparatus connecting mechanism structured and arranged to securely attach to the object and associate the object with said clamping apparatus,
    wherein when the bladder engaging section of the elongated member is in said member receiving area and each of said first bladder and said second bladder are in said inflated condition, said first bladder and said second bladder will tightly engage the elongated member to securely attach said clamping apparatus to the elongated member with the object at or against said front surface of said clamping apparatus so as to display or utilize the object when the object is attached to said clamping apparatus by said apparatus connecting mechanism.

12. The clamping apparatus of claim 11, wherein said first bladder, said second bladder and said connecting section define said member receiving area as having one of a generally U-shaped or C-shaped configuration.

13. The clamping apparatus of claim 11, wherein the object has a front surface and a back surface and each of said first bladder and said second bladder are structured and arranged to press against the back surface of the object so as to allow display or use of the front surface of the object when the object is attached to said first bladder and said second bladder by said apparatus connecting mechanism and said first bladder and said second bladder are in said inflated condition.

14. The clamping apparatus of claim 11, wherein said apparatus connecting mechanism is structured and arranged to engage one or more object connecting mechanisms associated with the object to securely attach the object to the clamping apparatus.

15. The clamping apparatus of claim 14, wherein said apparatus connecting mechanism and said object connecting mechanism are cooperatively configured so as to securely engage each other to securely hold the object to the clamping apparatus.

16. A clamping system, comprising:
    an object having a front surface and a back surface;
    an elongated member having an outer surface and a bladder engaging section, said elongated member selected mount said object thereon; and
    a clamping apparatus having one or more bladders that each have an air chamber therein, a member receiving area associated with said one or more bladders, an air valve associated with each of said air chambers and an apparatus connecting mechanism associated with at least one of said one or more bladders, each of said one or more bladders defining a front surface and a back surface of said clamping apparatus, said member receiving area sized and configured to receive said bladder engaging section of said elongated member therein, said air valves configured to allow pressurized air to be received in and released from each of said air chambers to place each of said one or more bladders in, respectively, one of an inflated condition to expand said one or more bladders and a deflated condition to reduce the size of said one or more bladders; said apparatus connecting mechanism structured and arranged to securely attach to the object and associate the object with said clamping apparatus,
    wherein when the bladder engaging section of the elongated member is in said member receiving area and each of said one or more bladders are in said inflated condition, said one or more bladders will tightly engage the elongated member to securely attach said clamping apparatus to the elongated member with the object at or against said front surface of said clamping apparatus so as to display or utilize the object when the object is attached to said clamping apparatus by said apparatus connecting mechanism.

17. The clamping system of claim 16, wherein said clamping apparatus comprises at least a first bladder and a second bladder that both sized and configured to define said member receiving area having engaging sides associated with each of said first bladder and said second bladder that will tightly engage the bladder engaging section of the elongated member when the bladder engaging section of the elongated member is in said member receiving area and each of said bladders are in said inflated condition.

18. The clamping system of claim 17 further comprising a connecting section interconnecting said first bladder and said second bladder, said connecting section further defining said back surface of said clamping apparatus.

19. The clamping system of claim 18, wherein said first bladder, said second bladder and said connecting section define said member receiving area as having one of a generally U-shaped or C-shaped configuration.

20. The clamping system of claim 16 further comprising an air filling mechanism that is structured and arranged to connect to each of said air valves and to direct pressurized air into each of said air chambers.

* * * * *